(12) United States Patent
Kijashka

(10) Patent No.: US 12,068,508 B2
(45) Date of Patent: Aug. 20, 2024

(54) BUTTON BATTERY

(71) Applicant: ESKP3 Pty Ltd, Forest Lake (AU)

(72) Inventor: Elizabeth Abigael Kijashka, Ellen Grove (AU)

(73) Assignee: ESKP3 PTY LTD, Forest Lake (AU)

( * ) Notice: Subject to any disclaimer, the term of this patent is extended or adjusted under 35 U.S.C. 154(b) by 0 days.

(21) Appl. No.: 17/746,414

(22) Filed: May 17, 2022

(65) Prior Publication Data
US 2022/0367988 A1 Nov. 17, 2022

(30) Foreign Application Priority Data

May 17, 2021 (AU) .................. 2021901466

(51) Int. Cl.
H01M 50/56 (2021.01)
H01M 50/109 (2021.01)
H01M 50/153 (2021.01)

(52) U.S. Cl.
CPC ......... *H01M 50/56* (2021.01); *H01M 50/109* (2021.01); *H01M 50/153* (2021.01); *H01M 2220/30* (2013.01)

(58) Field of Classification Search
CPC ............. H01M 10/6551; H01M 50/56; H01M 50/109; H01M 50/153; H01M 2220/30
See application file for complete search history.

(56) References Cited

U.S. PATENT DOCUMENTS

| 4,224,387 | A | * | 9/1980 | Nakayama | H01M 50/109 |
| | | | | | 429/174 |
| 10,826,050 | B1 | | 11/2020 | Kaehr et al. | |
| 2010/0003581 | A1 | * | 1/2010 | Kawai | H01M 10/6567 |
| | | | | | 361/521 |
| 2012/0021260 | A1 | * | 1/2012 | Yasui | H01M 10/615 |
| | | | | | 429/71 |
| 2012/0156540 | A1 | * | 6/2012 | Hsu | H01M 10/66 |
| | | | | | 429/120 |
| 2014/0154538 | A1 | * | 6/2014 | Suzuki | H01M 10/6551 |
| | | | | | 429/72 |
| 2014/0363710 | A1 | * | 12/2014 | Lee | H01M 10/6557 |
| | | | | | 429/83 |
| 2016/0343999 | A1 | | 11/2016 | Yonemura et al. | |

(Continued)

FOREIGN PATENT DOCUMENTS

| CN | 203423230 | * | 2/2014 |
| CN | 215474795 | * | 1/2022 |

(Continued)

OTHER PUBLICATIONS

Machine translation in English of Abstract of CN203423230 (Year: 2023).*

(Continued)

*Primary Examiner* — Brian R Ohara
(74) *Attorney, Agent, or Firm* — Hahn Loeser & Parks LLP

(57) ABSTRACT

A battery is provided comprising an anode cap on a first side, and a cathode can on the opposing second side. The anode cap and cathode can be configured together to provide a cylindrical shaped round shaped battery with a peripheral side wall. The battery is modified to have one or more sharp protrusions extending from the peripheral side wall to increase the width and or height of the battery.

14 Claims, 7 Drawing Sheets

(56) References Cited

U.S. PATENT DOCUMENTS

2020/0052343 A1    2/2020  Imoto et al.
2022/0123295 A1*   4/2022  Oda ..................... H01M 4/366

FOREIGN PATENT DOCUMENTS

JP      10214605 A  *  8/1998  ......... H01M 10/613
JP      10214605    * 11/1998

OTHER PUBLICATIONS

Machine translation in English of Abstract CN215474795 (Year: 2023).*
Machine translation in English of JP10214605 (Year: 2023).*
Australian International-type Search for Provisional Patent Application AU 2021901466 dated Aug. 17, 2021, 19 pages.

* cited by examiner

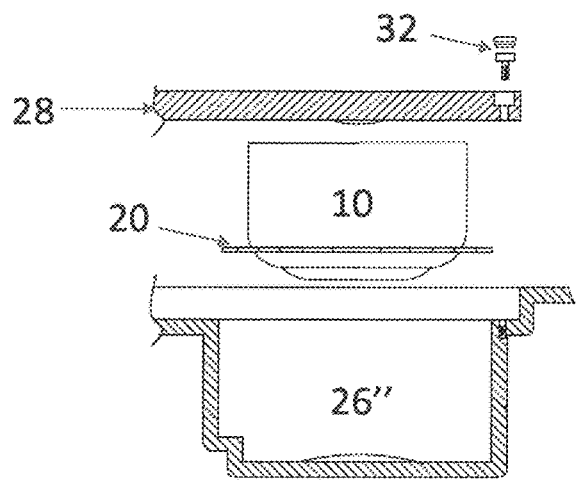
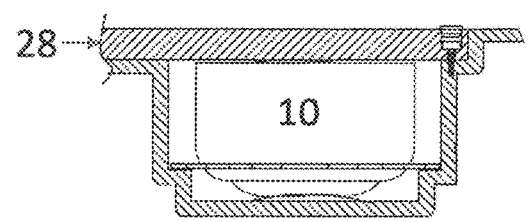
Figure 8
Figure 9
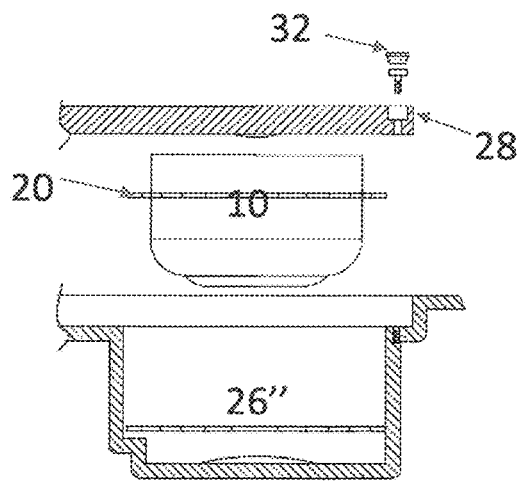
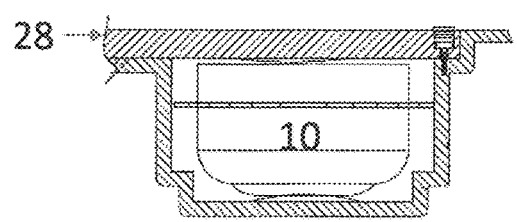

BUTTON BATTERY

CROSS REFERENCE TO RELATED APPLICATIONS

This application claims priority to, and the benefit of, Australian Provisional Application No. 2021901466, filed May 17, 2021, which is incorporated by reference herein.

TECHNICAL FIELD

The present invention relates to button batteries used to power small electronic devices.

BACKGROUND

A lithium battery can come in the form of a flat round battery sometimes referred to as a button cell, button battery or coin battery. The flat round battery is typically about 5 to about 25 mm in diameter and about 1 to about 6 mm in thickness. The battery usually has a stainless-steel bottom body which also acts as the positive terminal of the battery cell. An insulated top cap is the negative terminal.

The button battery can be used to power small electronic devices such as watches and calculators.

A problem with button batteries is that they are small and shiny and can be readily picked up by children. If the child puts the battery into their mouth and swallows it, the battery can burn through their oesophagus in less than 2 hours causing significant injury and in many cases, death. Some estimates are that 20 children per week are presenting to emergency departments in hospitals in Australia with button battery related injuries.

There exists a need for an improved button battery that in embodiments reduces the potential for harm to children and is therefore safer for general use in the home.

SUMMARY OF INVENTION

According to a first aspect of the invention there is provided a battery which can be in the form of a flat round shaped battery, sometimes referred to as a button battery, the flat round shaped battery being of the type comprising an anode cap on a first side, and a cathode can on the opposing second side, the anode cap and cathode configured together to provide a cylindrical shaped flat round shaped battery with a peripheral side wall, wherein the battery is modified to have one or more sharp protrusions extending from the peripheral side wall to increase the width and or height of the battery.

The battery of the present invention has one or more sharp protrusions around its outside peripheral edge to prevent or at least discourage small children from picking up and handling the battery. The battery can be handled by an adult using e.g., tweezers supplied together with the battery. It is thought that a child, having soft skin, will be unlikely to pick up such a prickly edged battery and is unlikely to want to put such a sharp feeling/looking item in their mouth. The battery would highly likely hurt the child's fingers immediately upon handling and would very likely hurt upon touching to the lips or tongue. This small or minor initial deterrent is thought to be desirable when compared to the considerable risk faced to the child if the battery is ingested. The same argument would apply not just to children, but also to adults who are intellectually or physically impaired and who may mistake the battery for something edible. The sharp protrusions would likely ensure they are not of a mind to ingest the item. The same argument or minor deterrent would apply to an animal that came across the battery.

The battery being preferably a flat round-shaped battery is of the type commonly used in small electronic devices that have a battery-shaped space that is small, round, and cylindrical in nature. It should be understood, however, that the battery need not be round shaped and could be square, triangular, hexagonal or some other shape such as ovaloid. While the battery can be of any shape, the most common shape is disc shaped (round) and the battery is referred to as a "button battery" (and sometimes a coin battery) because it appears like a small button or coin. The batteries are usually single use and disposable.

The battery comprises a cathode and an anode. The anode material can be any known material such as zinc or lithium. The cathode material can be any known material such as manganese dioxide, silver oxide, carbon monofluoride, cupric oxide or oxygen from the air. Typically, the anode and cathode are provided in the interior of the battery, separately, in a housing that is formed from an anode cap and a cathode can. The anode cap (a rounded open cylinder) can be received within the cathode can (a rounded open cylinder) to provide the overall round cylindrical shape of the battery. The battery has a peripheral side wall formed by the cylindrical wall of the cathode can.

Typically, the top of the battery formed by the cathode can is etched with information that is visual to the naked eye of the user including details about the battery type and size. Usually only the top, positive side of the battery is etched. The negative bottom side of the battery formed by the anode cap and might not have any markings at all.

The peripheral side wall of the battery is modified so as to have one or more sharp protrusions. By sharp, it is meant any extension from the side wall that causes a pricking or cutting sensation on the skin but does not necessarily break or cut the skin in use. The edges of the protrusions might be small in diameter to feel like spike(s). The shape of the protrusion(s) might be such that they each narrow towards a sharp spike-like or pointed end. The sharp protrusion(s) should discourage small children, usually with soft skin, from touching the battery. The child might reach out and touch the battery and might immediately drop the battery once they feel the undesirable nature of the sharp outside edge. It is possible that the child will be cut by the sharp protrusions, but it is expected that any such small prick would be equivalent to that of touching a sewing needle or alternatively, some other prickly item found naturally (a bindi from a bindi weed). The small cut or puncture of the child's skin may serve as a deterrent for any future thoughts to touch the battery or any similar looking battery (even one without spikes). Furthermore, it is possible that an adult user of the battery will be extra cautious with the battery since they are immediately reminded by its prickly nature that the battery is potentially injurious and should be treated with caution. Any minor surface wound that the child experiences from the sharp protrusions, is thought to be a worthwhile trade-off when compared to the much more damaging possibility of the child ingesting the battery.

There can be one sharp protrusion on the battery surface. There can be two sharp protrusions on the battery surface. There can be three sharp protrusions on the battery surface. Preferably, the entire periphery of the surface of the battery includes protrusions. Where there are multiple sharp protrusions, these can be arranged in series with no spacing between them. Alternatively, the protrusions can be arranged equidistant with spaces between them around the outside edge of the battery to maximise the chance they will be touched upon picking up the battery. In some embodiments, there are sharp protrusions around the entire outside edge of the battery with no spacing between them. This may be a preferred embodiment since there is little chance that the child's fingers will miss touching the protrusions on attempting to pick up the battery.

There can be at least about 5, 8, 10, 12, 15 or 20 sharp protrusions around the battery cell. In a battery with a 10 mm diameter, and a circumference of about 31.4 mm, there can be at least about 10 sharp protrusions in series, each taking up a base part of the circumference of about 3 mm. There are many and various arrangements of protrusions that can be used as a possible deterrent.

The length of the protrusions measured from the side wall to the end of the protrusion extension can be at least about 1, 2, 3, 4, or 5 mm. The length of the protrusion may increase according to the size of the battery. For example, a larger button battery with a 20 mm diameter might have overall longer protrusions such as 5 mm, whereas a smaller battery with a 7 mm diameter might have only 2 mm protrusions. If there are multiple protrusions, not all need to be equal in size and or shape. In an embodiment, the or each protrusions increase the diameter of the battery by at most about 40, 50 or 60%.

The protrusions can be referred to as teeth and may appear substantially triangular when viewed from above. Alternatively, the protrusions may appear substantially rectangular when viewed from above. The shape and configuration of each protrusion is limited only by the manufactured ability to prepare the requisite shapes.

In an embodiment, the sharp protrusions (optionally in the form of teeth) are in a single plane that is the same as the plane of the top surface of the battery. In an embodiment, the protrusions are themselves offset with respect to the plane of the top surface of the battery. The offset can be any angle including 45 degrees or 90 degrees. There can be one row of protrusions. There can be more than one row of protrusions.

In an embodiment, the protrusions are formed to retrofit to an already formed battery. Each protrusion can be attached to the battery by any means such as adhesive or welds. In some embodiments, a series of protrusions is provided for attachment to an existing battery. The series of protrusions could be arranged on a strip such as a thin metal gasket. The thin metal gasket of protrusions could be attachable to the side wall of the battery side wall. Alternatively, the sharp protrusions are integrally formed with the cathode can of the battery during manufacture. Embodiments in which the protrusions are integrally formed are preferred since the protrusions are likely more difficult to remove once in place.

In some embodiments, the battery can be further modified using colours and or shapes that make it further unappealing. For example, the battery might be green or red or stripped with unappealing or warning colours. There could be a mean or angry looking face depicted on one or both surfaces of the battery to serve as a warning to the child that the battery is not to be touched. Such deterrents are also found in nature, where poisonous materials are coloured e.g., red and or otherwise modified so as to be unappealing to human contact.

The batteries can be sold in pack together with the standard size of the battery provided as marketing information. The size of button batteries is usually indicated by a 2-digit code representing a standard case size, or a 3- or 4-digit code representing the cell diameter and height. The first one or two digits usually encode the diameter of the battery in whole millimetres, rounded down. The last two digits are the overall height in tenths of a millimetre.

Once the sharp protrusions are added to the battery surface, the largest diameter of the battery is larger than the battery without the protrusion(s). Accordingly, when being inserted into electronic devices, a modification may be required to the housing in the electronic device in order to accommodate the sharp protrusions. In an embodiment, the space for housing the battery inside the device may need to be widened to accommodate the modified battery with the sharp protrusions. In a preferred embodiment, the sharp protrusions are located towards the top surface of the battery, so that the modification required to the space in the electronic device is limited to a shelf in the upper surface of the opening for the battery. The battery can be inserted into the device and the protrusions can be accommodated by the shelf in the device.

Once in the device, the battery is covered by a cover to protect it during use. The cover should be securable in place preferably by one or more screws to prevent or at least reduce the chance that a child can remove the battery from the device.

BRIEF DESCRIPTION OF THE FIGURES

Embodiments of the invention will now be described with reference to the accompanying drawings which are not drawn to scale and which are exemplary only and in which:

FIG. 8 is a side view of the battery of FIG. 2A in the housing of FIG. 6.

FIG. 9 is a side view of the battery of FIG. 4 in the housing of FIG. 6.

DETAILED DESCRIPTION OF EMBODIMENTS OF THE INVENTION

Figure 1:
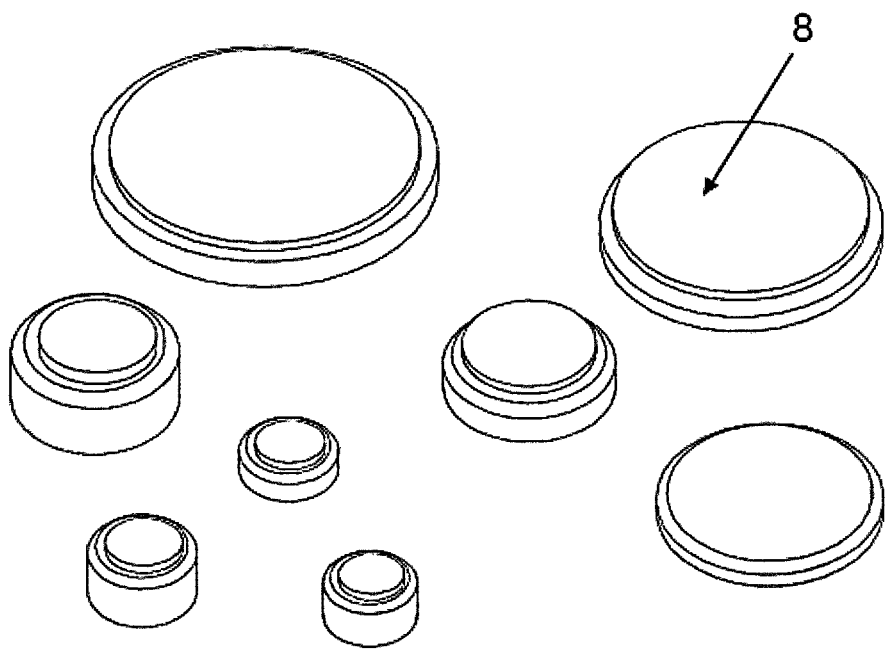
FIG. 1 shows some prior art batteries.

FIG. 1 shows several prior art small flat round-shaped batteries 8 which are of the type commonly used in small electronic devices. The device that employs the battery can be a watch, a calculator a hearing aid a small toy or any other device that requires the small power cell type of battery.

FIG. 2 is a cut away of one example of a button battery 10 according to an embodiment of the present invention. The battery 10 is similar to a prior art battery 8, only it is modified with protrusions 20. Only some of the protrusions 20 are labelled for clarity. The battery 10 comprises a cathode and an anode. The anode and cathode are provided separately in the interior of the battery 10. The housing for the anode and cathode is formed from an anode cap 12 and a cathode can 14. The anode cap 12 is shown as an open cylinder. The anode cap 12 has a diameter smaller than the cathode can 14 so that together they provide the cylindrical shape of the battery 10. A separator 18 can be located between the anode cap 12 and cathode can 14 for insulation. The battery has a peripheral side wall 16 formed by the cylindrical wall of the cathode can 14.

The peripheral side wall 16 of the battery 10 is modified with sharp protrusions 20. Each sharp protrusion in this embodiment is in the form of a triangular shaped tooth 20 that extends out from the side wall 16. The sharp tooth 20 can cause a pricking or cutting sensation on the skin when touched. In the embodiment shown, the protrusions 20 are integral with material of the cathode can 14 and are formed with it during manufacture. However, it should be understood that the protrusions 20 could be provided as cut outs in a thin strip of metal.

When the battery 10 is placed in an electronic device, the housing receives the battery with the bottom surface placed into the housing towards the bottom of the cavity and the top surface towards the top and exposed to view. The top surface of the battery usually has various details such as battery size and type etched into it.

Figure 2A:
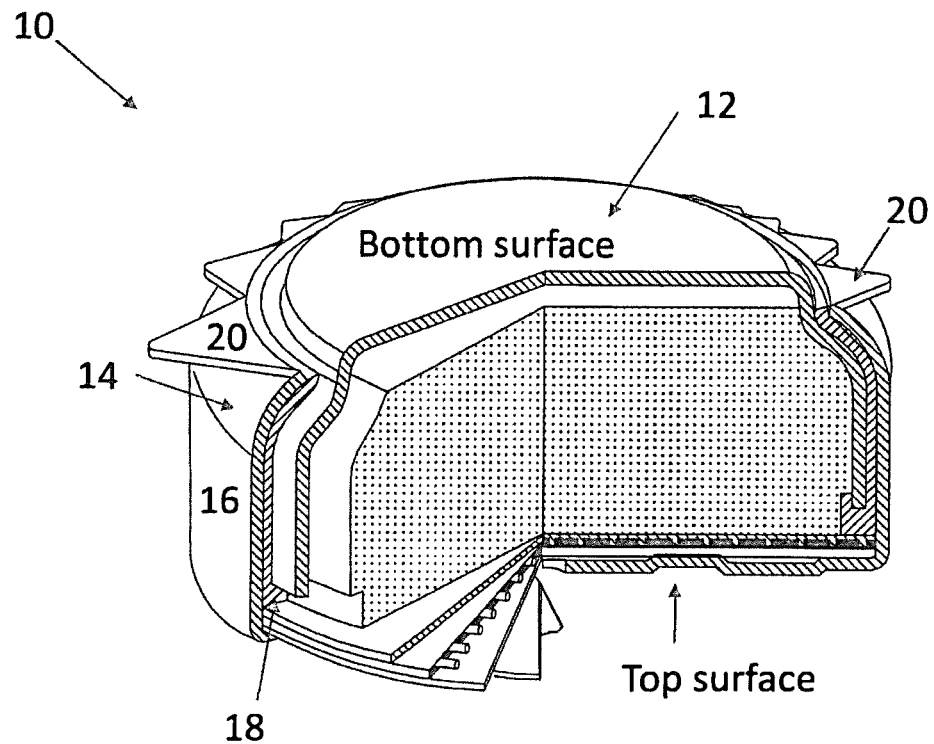
FIG. 2A is a battery according to an embodiment of the present invention.
Figure 2B:
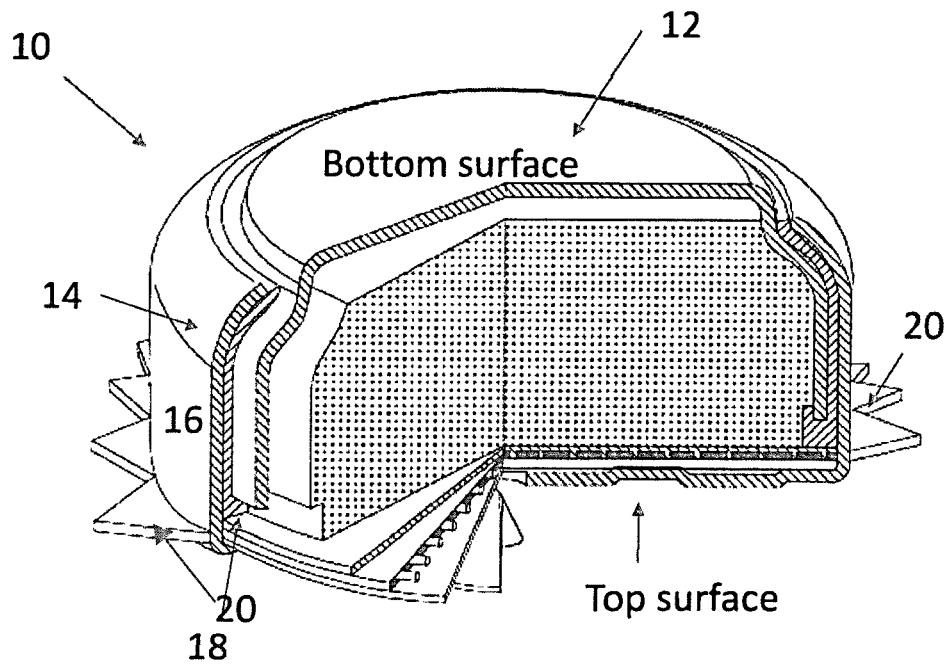
FIG. 2B is a battery according to another embodiment of the present invention.

In FIG. 2A, the protrusions 20 are shown towards the bottom side of the battery, the bottom side being the side that is located inside the bottom of a housing when the battery is in use. In FIG. 2B, the protrusions 20 are shown towards the top surface of the battery, the top surface being the side that is can be seen when the battery is in use.

Figure 3:
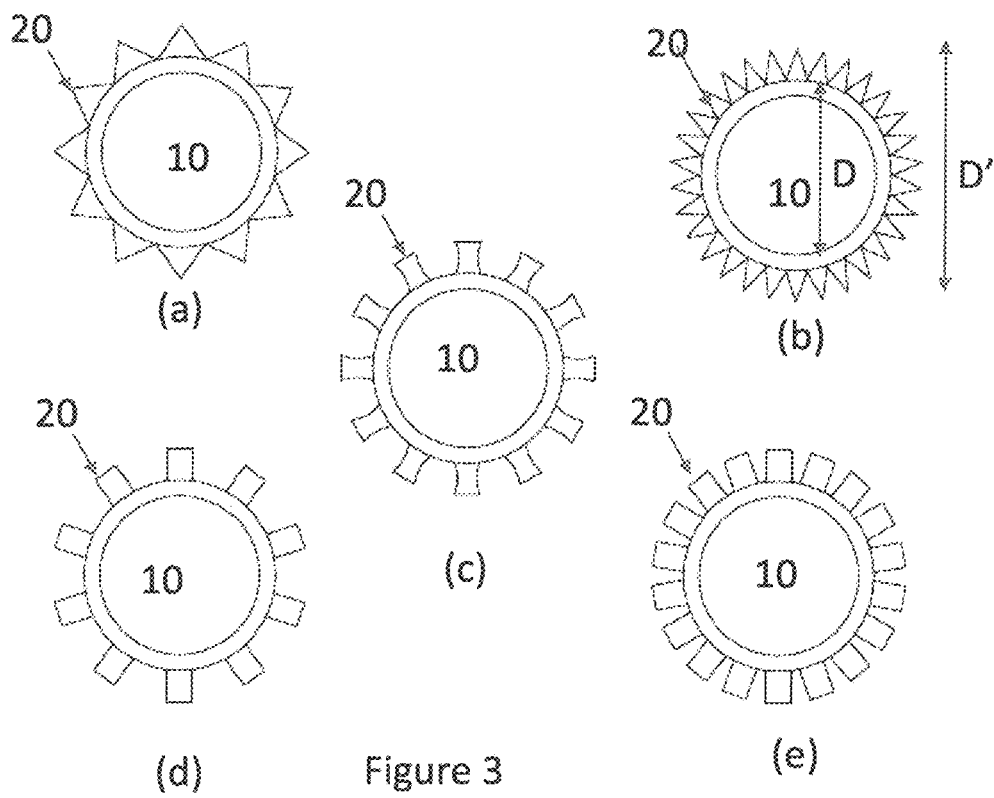
FIG. 3 is a birds eye view of various embodiments of the battery of FIG. 2.
Figure 4:
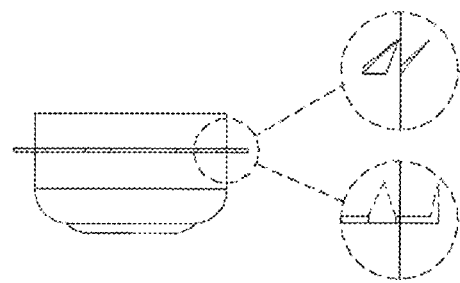
FIG. 4 is an alternative embodiment of the battery of the invention in which the protrusions are offset from the top plane of the battery.

FIG. 3 shows various embodiments of the battery 10 with different types of sharp protrusions. FIG. 3(a) has wide triangular shaped protrusions 20. FIG. 3(b) has triangular shaped protrusions 20, but they are more of them since the base of each tooth 20 is narrower. There could be a distance between each tooth 20 if desired. In FIGS. 3(d) and 3(e) there are rectangular shaped protrusions 20 spaced around the outside periphery of the battery 10. In FIG. 3(c) the protrusions are rectangular but are waisted so as to provide additional sharpness to their outside edges. The configurations shown in FIG. 3 are not to scale but serve to exemplify that there can be multiple and various types of sharp protrusions 20 around the side wall 16 of battery 10. In each of Figures (a) to (e) the sharp protrusions 20 are in a single plane that is the same as the plane of the top surface of the battery 10. However, as shown in FIG. 4, the protrusions 20 could be offset from the top plane, e.g., by 45 degrees but still provide the same effect. The offset could be by 90 degrees if the protrusions are extended from the outside surface.

Figure 5:
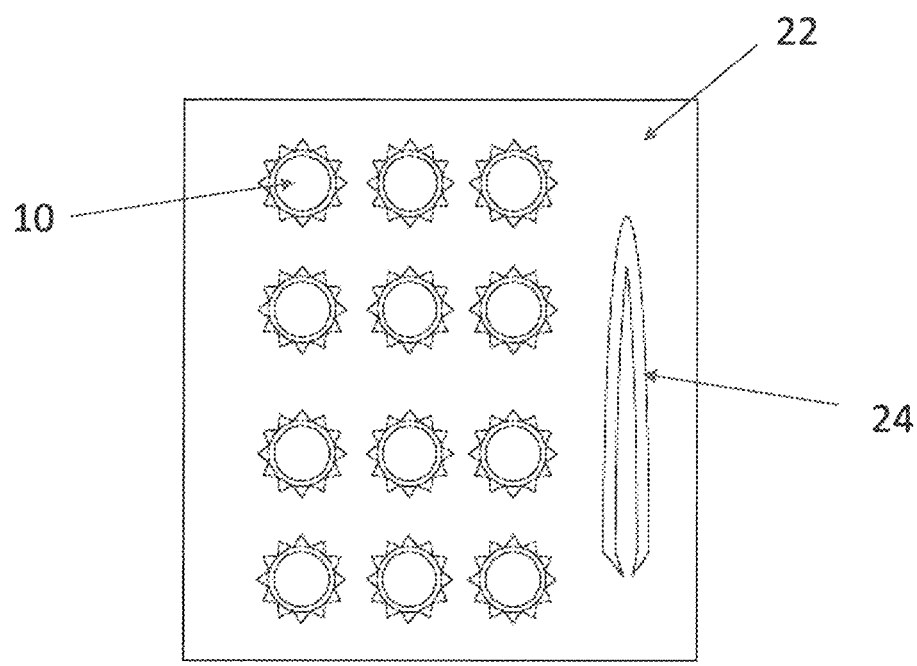
FIG. 5 shows a plurality of the batteries in a pack.

FIG. 5 shows the batteries 10 in a pack 22 ready to be used. The batteries 10 are provided with tweezers 24 that can be used to handle each battery 10 without it pricking the fingers. The user opens the pack 22 and takes control of the tweezers 24. Each battery 10 is handleable using the tweezers 24 to remove it from pack 22 and to place it into a battery housing in an electronic device. If the battery 10 is left unattended inadvertently, the dangerous item is locatable by a child. A child might pick up the battery 10 in curiosity and possibly will put the battery 10 into to their mouth. The sharp protrusions 20 are thought to be a reminder not to leave the battery 10 unattended and a deterrent for the child if they locate the battery 10.

In order to attach the protrusions 20 to the battery 10 they could be provided to the manufacture or user as a thin metal gasket that is attachable to a prior art battery 8. The thin metal gasket of protrusions 20 could be attachable to the side wall 16 of the battery 10. Alternatively, the sharp protrusions 20 are integrally formed with the cathode can 14 of the battery 10 during manufacture.

Figure 6A:
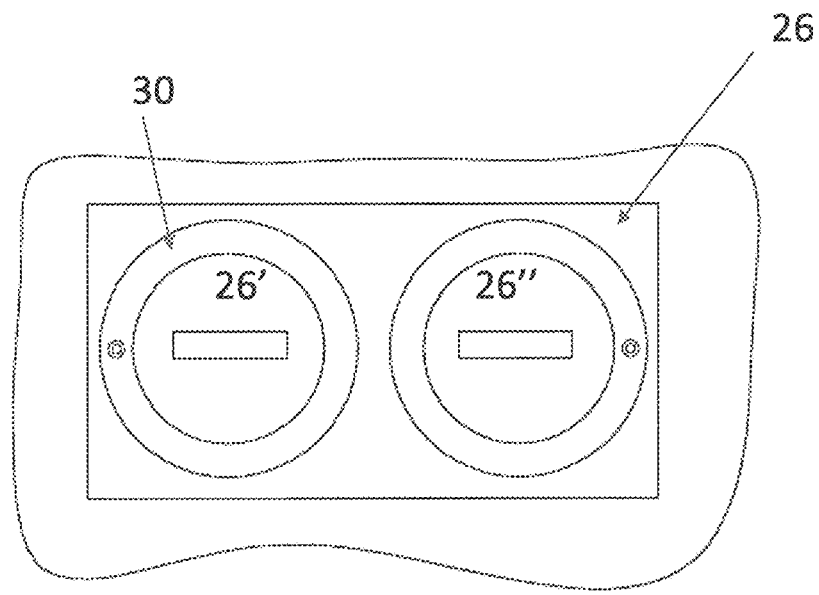
FIG. 6A is an empty housing in an electronic device for receiving two batteries of the embodiment of e.g., FIG. 2.
Figure 6B:
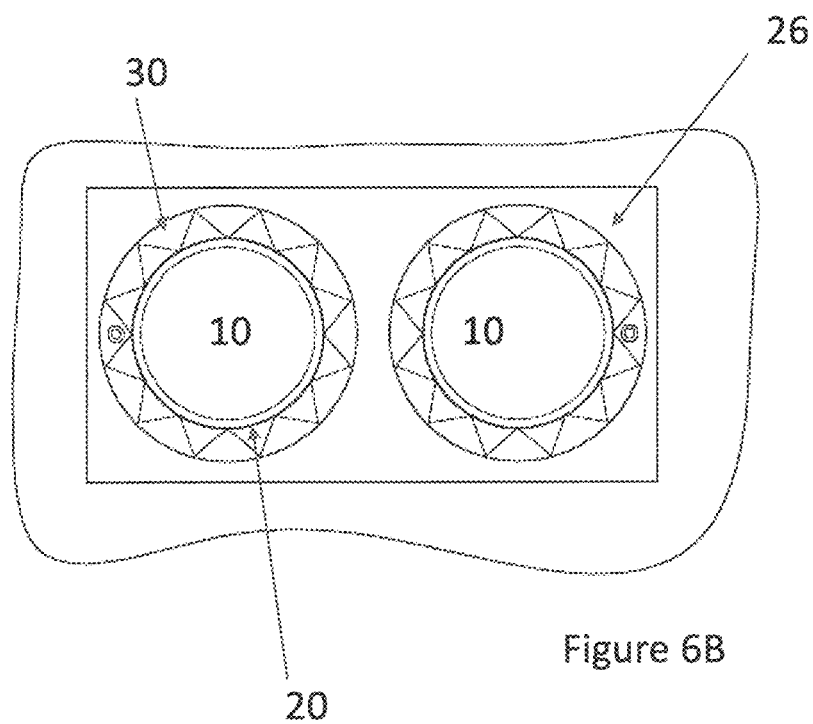
FIG. 6B is the housing of FIG. 6A filled with the batteries.

The battery 10 (as shown in FIG. 3) has a diameter D. The diameter of the battery 10 increases to D' by the presence of the protrusions 20. Due to the increase in diameter to D', the housing in the electronic device may require modification. FIG. 6A shows a housing 26 for two batteries in an electronic device, a first battery 10 can be placed in receptacle 26' and a second battery can be placed into receptable 26". In FIG. 6A, the housing 26 is empty. A cut out shelf 30 is shown around each receptacle 26' and 26" which can accommodate the protrusions 20 on each battery 10 respectively. The cut out 30 has a diameter of about D' or just wider than D'. In FIG. 6B the two batteries 10 are shown placed into the housing 26. The triangular shaped protrusions 20 are shown resting on shelf 30.

Figure 7:
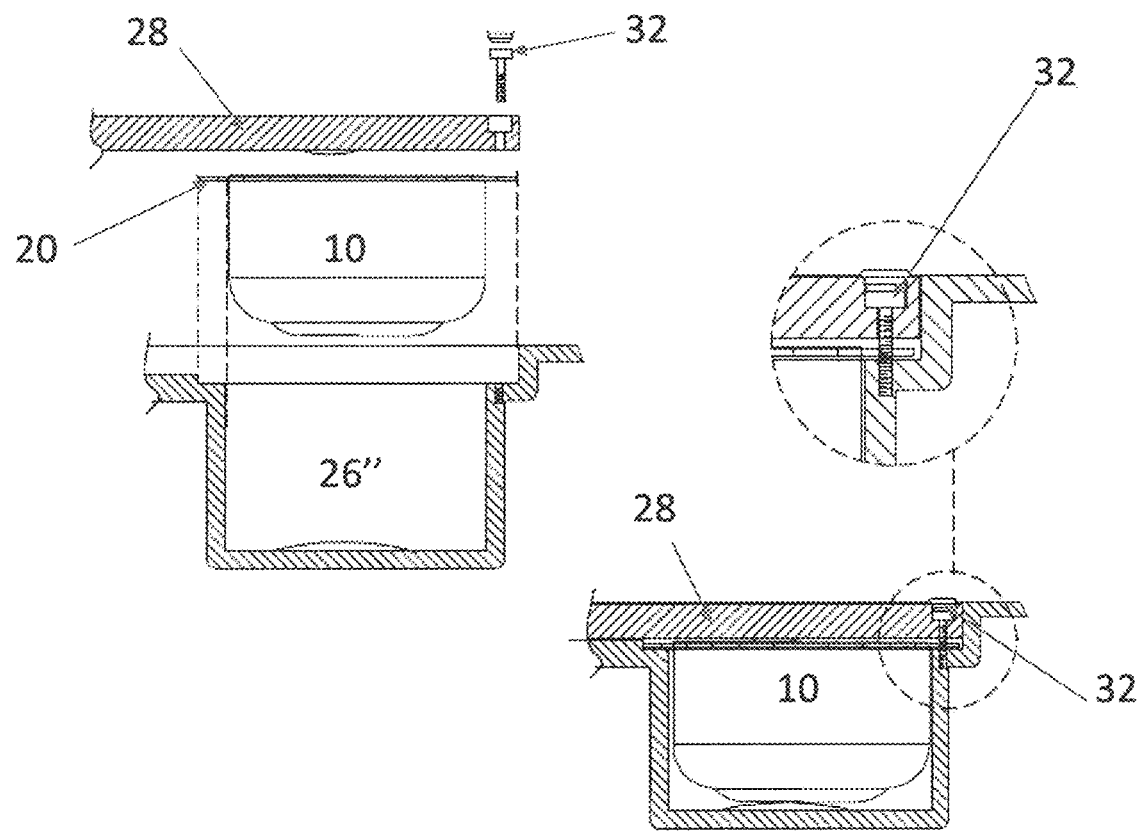
FIG. 7 is a side view of the battery of FIG. 2B in the housing of FIG. 6.

FIG. 7 is a side view of one of the batteries from FIG. 6B. Since the battery 10 is in place, cover 28 is located over the battery to ensure it cannot be removed. A screw 32 is locatable into the cover to hold it firmly into place.

FIGS. 8 and 9 are a side views of alternative embodiments in which the protrusions 20 are located mid-way (FIG. 9) or towards the bottom surface of the battery 10 (FIG. 8). Due to the location of the protrusions 20, they cannot rest on upper shelf 30 and instead the entire housing 26 must be modified to be wider (just wider than D') to accommodate battery 10.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

Any promises made in the present description should be understood to relate to some embodiments of the invention and are not intended to be promises made about the invention as a whole. Where there are promises that are deemed to apply to all embodiments of the invention, the applicant/patentee reserves the right to later delete them from the description and does not rely on these promises for the acceptance or subsequent grant of a patent in any country.

What is claimed is:

1. A battery comprising an anode cap on a first side, and a cathode can on the opposing second side, the anode cap and cathode can configured together to provide a cylindrical shaped battery with a peripheral side wall;
   wherein the battery is modified to have two or more flat plates, all of the two or more flat plates comprise a sharp protrusion extending from the peripheral side wall to increase the width or height of the battery, all of the two or more flat plates with the sharp protrusion are arranged in series in an in-line and side-by-side arrangement, and the sharp protrusion of each plate of all of the two or more flat plates are in a single plane that is oriented parallel to a corresponding plane of the first side of the battery; and
   wherein a first section of all of the two or more flat plates extend from the peripheral side wall and is parallel to the corresponding plane of the first side of the battery and a second section of all of the two or more flat plates extend from the first section and is perpendicular to the first section and the corresponding plane of the first side of the battery.

2. A battery according to claim 1, wherein all of the two or more flat plates with the sharp protrusion narrow as each flat plate extends from the peripheral side wall.

3. The battery according to claim 1, wherein the anode cap defines a bottom surface of the battery and the cathode can defines a top surface of the battery, and all of the two or more flat plates with the sharp protrusion are arranged towards the top surface of the battery in a plane substantially the same as the plane of the top surface.

4. The battery according to claim 1, wherein the sharp protrusion is substantially triangular tooth shaped.

5. An electronic device modified to accommodate the battery according to claim 3.

6. The battery according to claim 1, wherein all of the two or more flat plates with the sharp protrusion narrow in line with the plane that is oriented parallel to a corresponding plane of the first side of the battery.

7. The battery according to claim 1, wherein adjacent surfaces of each flat plate of all of the two or more flat plates are oblique.

8. The battery according to claim 1 wherein the cylindrical shaped battery is a battery cell comprising a diameter of about 5 mm to about 25 mm and a thickness of about 1 mm to about 6 mm.

9. A cylindrical shaped button battery cell comprising an anode cap on a first side, a cathode can on the opposing second side, a peripheral side wall, and two or more flat plates with a protrusion extending from the peripheral side wall increasing a diameter or thickness of the battery cell, all of the two or more flat plates with the protrusion are in a plane that is oriented parallel to a corresponding plane of the first side of the battery cell;
wherein the diameter of the battery cell is about 5 mm to about 25 mm and the thickness is about 1 mm to 6 mm;
wherein each flat plate of all of the two or more flat plates with the protrusion narrow as each flat plate extends from the peripheral side wall; and
wherein a first section of all of the two or more flat plates extend from the peripheral side wall and is parallel to the corresponding plane of the first side of the battery cell and a second section of all of the two or more flat plates extend from the first section and is perpendicular to the first section and the corresponding plane of the first side of the battery cell.

10. The battery cell according to claim 9 wherein all of the two or more flat plates with the protrusion are in series with no spacing between them in an in-line and side-by-side arrangement in the plane that is oriented parallel to the corresponding plane of the first side of the battery.

11. A battery comprising an anode cap on a first side, and a cathode can on the opposing second side, the anode cap and cathode can configured together to provide a cylindrical shaped battery with a peripheral side wall;
wherein the battery comprises two or more flat plates with a protrusion extending from the peripheral side wall to increase a diameter or a thickness of the battery, all of the two or more flat plates with the protrusion are in a plane that is oriented parallel to a corresponding plane of the first side of the battery in an in-line and side-by-side arrangement with no spacing between them; and
wherein a first section of all of the two or more flat plates extend from the peripheral side wall and is parallel to the corresponding plane of the first side of the battery and a second section of all of the two or more flat plates extend from the first section and is perpendicular to the first section and the corresponding plane of the first side of the battery.

12. The battery according to claim 11 wherein each flat plate of the two or more flat plates with the protrusion narrow as each flat plate extends from the peripheral side wall and a width of the flat plate is less than a distance the flat plate extends from the peripheral side wall.

13. The battery according to claim 1, wherein all of the two or more flat plates are arranged with no spacing between them.

14. The battery according to claim 1, wherein all of the two or more flat plates are arranged with no spacing between them and all of the two or more flat plates are in a zig-zag arrangement.

* * * * *